United States Patent
Carpio et al.

(10) Patent No.: US 8,132,070 B2
(45) Date of Patent: Mar. 6, 2012

(54) USING DIFFERENT PHYSICAL INTERFACE TO REQUEST RETRANSMISSION OF PACKET LOST ON UNIDIRECTIONAL INTERFACE

(75) Inventors: Fredrik Carpio, San Diego, CA (US); Milton Massey Frazier, San Marcos, CA (US); Nikolaos Georgis, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 930 days.

(21) Appl. No.: 12/142,087

(22) Filed: Jun. 19, 2008

(65) Prior Publication Data

US 2009/0319847 A1  Dec. 24, 2009

(51) Int. Cl.
  *G08C 25/02* (2006.01)
(52) U.S. Cl. .................................................. 714/748
(58) Field of Classification Search ............... 714/748
  See application file for complete search history.

(56) References Cited

U.S. PATENT DOCUMENTS

| | | | | |
|---|---|---|---|---|
| 5,430,738 A * | 7/1995 | Tsuda | ................ | 714/748 |
| 5,594,490 A * | 1/1997 | Dawson et al. | ................ | 725/67 |
| 6,343,067 B1 | 1/2002 | Drottar et al. | | |
| 7,356,751 B1 * | 4/2008 | Levitan | ................ | 714/748 |
| 7,782,836 B2 * | 8/2010 | Shao et al. | ................ | 370/349 |
| 2002/0095636 A1 * | 7/2002 | Tatsumi et al. | ................ | 714/748 |
| 2003/0016673 A1 * | 1/2003 | Pendakur et al. | ................ | 370/394 |
| 2003/0093799 A1 * | 5/2003 | Kauffman et al. | ................ | 725/86 |
| 2004/0236863 A1 | 11/2004 | Shen et al. | | |
| 2005/0071875 A1 * | 3/2005 | Kempisty | ................ | 725/56 |
| 2005/0188410 A1 * | 8/2005 | Kahn et al. | ................ | 725/100 |
| 2006/0048196 A1 * | 3/2006 | Yau | ................ | 725/81 |
| 2006/0236153 A1 * | 10/2006 | Aaltonen | ................ | 714/25 |
| 2006/0268871 A1 * | 11/2006 | Van Zijst | ................ | 370/390 |
| 2008/0032721 A1 * | 2/2008 | MacDonald et al. | ................ | 455/466 |
| 2008/0253564 A1 * | 10/2008 | Kahn et al. | ................ | 380/200 |

OTHER PUBLICATIONS

Humaira Kamal, Brad Penoff, Alan Wagner; "SCTP versus TCP for MPI", http://delivery.acm,org/10.1145/1110000/1105795/27580030.pdf?key1=1105795&key2=5679258021&coll=GUIDE&dl=CFID=24659936&CFTOKEN=40532902, Nov. 12-18, 2005 ISBN:1-59593-061-2.

* cited by examiner

*Primary Examiner* — Robert Beausoliel, Jr.
*Assistant Examiner* — Neil Miles
(74) *Attorney, Agent, or Firm* — John L. Rogitz

(57) ABSTRACT

Packets detected to be lost from a unidirectional interface such as an ATSC tuner are requested from the source or a peer using a different physical interface. The packets may be retransmitted for reception over either interface.

4 Claims, 1 Drawing Sheet

USING DIFFERENT PHYSICAL INTERFACE TO REQUEST RETRANSMISSION OF PACKET LOST ON UNIDIRECTIONAL INTERFACE

FIELD OF THE INVENTION

The present invention relates generally to requesting retransmission of a TV video packet that was intended to be received on a unidirectional interface, using a different physical interface available to the rendering device.

BACKGROUND OF THE INVENTION

TVs typically receive signals over unidirectional interfaces. Digital TV signals, for example, maybe received on a unidirectional advanced television systems committee (ATSC) tuner from a source of TV such as a cable head end, satellite receiver, and the like. As understood herein, because such an interface is unidirectional, any lost packets cannot be requested of the sender using the one-way interface.

SUMMARY OF THE INVENTION

A system includes a TV display, a unidirectional interface configured to receive TV signals from a source, and a processor accessing the unidirectional interface and configured to cause the display to present the TV signals. A bidirectional interface is configured to respond to a determination by the processor that information in the TV signals has been lost. The bidirectional interface responds by transmitting a request to retransmit the lost information.

The lost information may include at least one lost packet. The unidirectional interface can be a TV tuner such as an advanced television systems committee (ATSC) tuner.

The request to retransmit may be sent directly to the source. Or, the request to retransmit may be sent to a peer of the system. The peer may satisfy the request by retransmitting the packet to the requesting system. Retransmitted packets can be received at the unidirectional interface or at the bidirectional interface over, e.g., the Internet, in which case the bidirectional interface is a wired or wireless modem.

In another aspect, a tangible digital storage medium is readable by a processor to determine that a packet in a TV signal received at a unidirectional interface is lost, and in response to a determination of a lost packet, send a request for a retransmission of the packet using a physical interface different than the unidirectional interface.

In yet another aspect, when data is detected as being lost from a receiver, a retransmission of the data is requested from the source or a peer using a physical interface different from the receiver.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
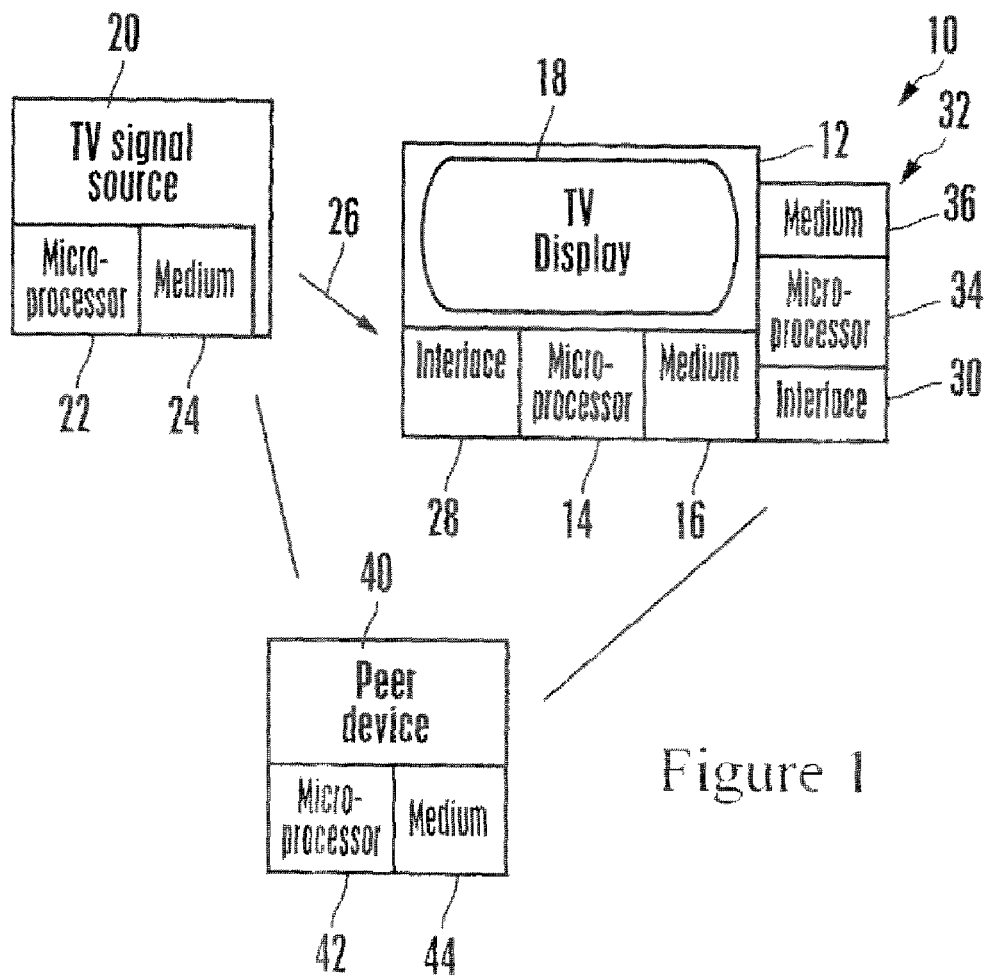
FIG. 1 is a schematic view of a non-limiting system in accordance with present principles.

Referring initially to FIG. 1, a system is shown, generally designated 10, that includes a TV 12 with TV processor 14 and tangible digital storage medium 16 that may be, without limitation, a magnetic or optical disk drive, a solid state device such as random access memory or read-only memory or flash memory, a removable stick medium or removable floppy disk, etc. The medium 16 and processor 14 may be stored in the TV housing as shown along with a display 18 such as but not limited to a high definition (HD) matrix display or a standard definition cathode ray tube display, or the processor 14 and/or medium 16 may be external to the TV housing, e.g., in a set-top box.

As shown in FIG. 1, a TV signal source 20 such as a cable head end, satellite receiver, and the like with source processor 22 and source computer medium 24 can provide TV signals over a typically unidirectional link 26 to an interface 28 of the TV 12. In one implementation, the interface 28 is a unidirectional ATSC tuner. The TV processor 14 causes the signals from the interface 28 to be presented on the display 18.

In the non-limiting embodiment shown in FIG. 1, the TV processor 14 may also have access to a second interface 30 that is a different physical interface than the unidirectional interface 28. In one embodiment the second interface 30 may be a wired or wireless computer modem incorporated into the TV 12 or, as shown, it may be housed in an Internet adapter module housing 32 that can also include a module processor 34 and module computer-readable medium 36. In either case, communication with a wide area computer network such as the Internet can be provided to the TV 12 using the second interface 30. The module 30, which can be implemented as a set-back box (SBB) or other device such as an optical disk player, may be physically engaged with the housing of the TV 12 with communication being established by respective connectors on the module and TV, or the module 30 may be connected via a cord to the TV 12.

In other embodiments, in addition to or in lieu of modem capability, the second interface 30 may be a wireless transmitter such as a Bluetooth transceiver, WiFi transceiver, WIMAX transceiver, or the like. Yet again, the second interface 30 may be a wireless telephony transceiver such as a global system for mobile communication (GSM) transceiver, code division multiple access (CDMA) transceiver or variant, etc. In any case, the second interface 30 typically is a bidirectional interface in that communication can pass through it in both directions, i.e., inbound and outbound.

Regardless of its implementation, the second interface 30 can establish communication with the source 20 over, e.g., the Internet and/or with one or more peer systems 40 of the TV 12 shown in FIG. 1. Each peer system 40 may be configured substantially identically to the TV 12 and thus may receive TV programming from the source 20. Each peer system includes, among other components, a peer processor 42 and a peer computer readable medium 44.

Figure 2:
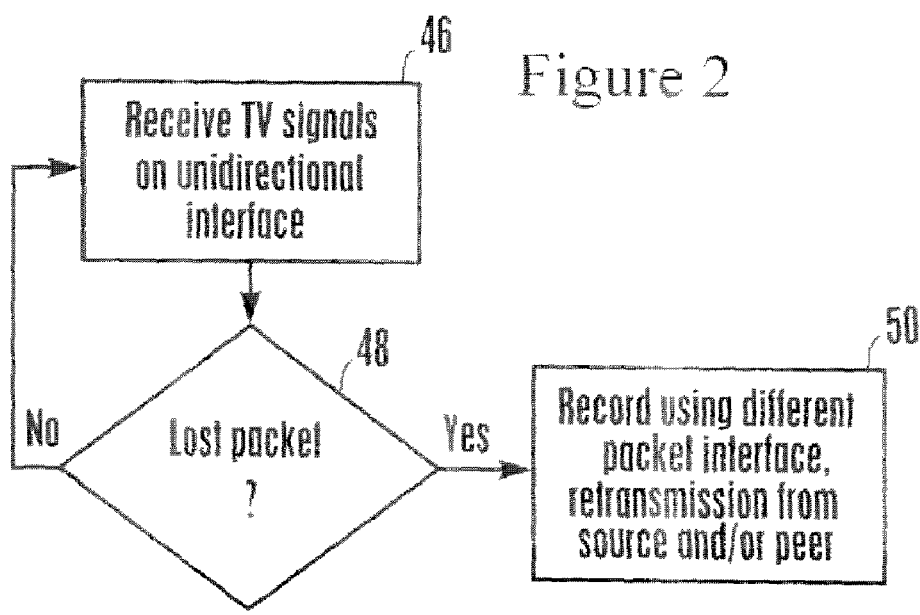
FIG. 2 is a flow chart of non-limiting logic which may be undertaken by one or more processors executing code elements stored on one or more computer readable media.

FIG. 2 shows logic in accordance with present principles that may be executed by one or more of the processor above accessing computer-readable instructions on one or more of the above-described media Commencing at block 46, TV signals are received at the unidirectional interface 28. These signals may be digital signals in which case the video information may be received in packet format.

At decision diamond 48, it is determined using means known in the art (e.g., using checksums, for instance) whether one or more packets that should have been received were lost. If so, at block 50 the TV processor 14 causes a request to be sent using the second interface 30 to resend the packets.

This request may be initiated by the TV processor 14 or by the module processor 34 The request may be sent to a peer 40 that might have received the same TV programming but without packet loss. In such a case, the peer 40 may send the requested packets directly to the TV 12 using, e.g., the second interface 30 of the TV 12, or the peer 40 may simply relay the request to the source 20.

Alternatively, the request sent through the second interface 30 may be sent directly to the source 20. In one implementation, the request is sent over the Internet (in which case the second interface 30 can be a modem) to a server associated with the source 20. In another implementation, the request is sent directly to the source 20 using other than an Internet path, e.g., using telephony channels (which might happen to traverse the same physical path as Internet traffic), in which case the second interface 30 is a telephony transceiver. The requested packets may be resent over the second interface 30 and delivered to the TV processor 14 for further processing. Or, the source 20 may elect to retransmit the requested packets in the current TV signal received at the unidirectional interface 28 using, e.g., the vertical blanking interval (VBI).

While the particular USING DIFFERENT PHYSICAL INTERFACE TO REQUEST RETRANSMISSION OF PACKET LOST ON UNIDIRECTIONAL INTERFACE is herein shown and described in detail, it is to be understood that the subject matter which is encompassed by the present invention is limited only by the claims. For example, present principles may be applied to wireless telephones, laptop computers, set top boxes, as well as to TVs. The affected data may include not only video packets but also audio data and binary data, which typically must be received 100% correctly. For example, if the binary data is intended to be part of a software application, it is desired that all data be received correctly.

What is claimed is:

1. A system, comprising:
   a TV display;
   a unidirectional interface configured to receive TV signals from a source;
   a processor accessing the unidirectional interface and configured to cause the display to present the TV signals; and
   a bidirectional interface configured to respond to a determination by the processor that information in the TV signals has been lost, the bidirectional interface responding by transmitting a request to retransmit the lost information;
   wherein the unidirectional interface is an advanced television systems committee (ATSC) tuner;
   wherein the request to retransmit is sent to a peer TV;
   wherein the peer TV satisfies the request; and
   wherein retransmitted information is received at the unidirectional interface.

2. The system of claim 1, wherein the lost information includes at least one lost packet.

3. A non-transitory tangible digital storage medium readable by a processor to:
   determine that at least one packet in a TV signal received at a unidirectional interface is lost; and
   in response to a determination, of a lost packet, sending a request for a retransmission of the packet using a physical interface different than the unidirectional interface;
   wherein the unidirectional interface is an advanced television systems committee (ATSC) tuner;
   wherein the request is sent to a peer TV for fulfillment of the request by the peer; and
   wherein retransmitted packets are received at the unidirectional interface.

4. A method comprising:
   detecting data as being lost from a receiver that includes a tuner on a TV; and
   requesting a retransmission of the data from the source or a peer using a physical interface different from the receiver;
   wherein the request is sent to a peer TV; and
   wherein retransmitted packets from the source are received at the receiver.

* * * * *